United States Patent
Shumard et al.

(10) Patent No.: US 12,149,913 B2
(45) Date of Patent: Nov. 19, 2024

(54) MICROPHONE WITH INTEGRATED MULTICHANNEL MIXER

(71) Applicant: Shure Acquisition Holdings, Inc., Niles, IL (US)

(72) Inventors: Brent Robert Shumard, Mount Prospect, IL (US); James Michael Pessin, Forest Park, IL (US); Timothy William Balgemann, Lombard, IL (US); Soren Christian Pedersen, Chicago, IL (US); Thomas Andrew Satrom, Chicago, IL (US); Ryan Jerold Perkofski, Lake Bluff, IL (US)

(73) Assignee: Shure Acquisition Holdings, Inc., Niles, IL (US)

( * ) Notice: Subject to any disclaimer, the term of this patent is extended or adjusted under 35 U.S.C. 154(b) by 125 days.

(21) Appl. No.: 17/676,322

(22) Filed: Feb. 21, 2022

(65) Prior Publication Data
US 2022/0272473 A1 Aug. 25, 2022

Related U.S. Application Data

(60) Provisional application No. 63/152,262, filed on Feb. 22, 2021.

(51) Int. Cl.
*H04S 3/00* (2006.01)
*G06F 3/16* (2006.01)
(Continued)

(52) U.S. Cl.
CPC .............. *H04S 3/008* (2013.01); *G06F 3/165* (2013.01); *G10L 19/008* (2013.01); *H04R 1/04* (2013.01);
(Continued)

(58) Field of Classification Search
CPC .. H04S 3/008; H04S 2400/01; H04S 2400/15; G06F 3/165; G10L 19/008;
(Continued)

(56) References Cited

U.S. PATENT DOCUMENTS 6,007,228 A * 12/1999 Agarwal ................. G06F 3/162
381/119
6,374,148 B1 * 4/2002 Dharmarajan .......... G06F 3/162
381/119
(Continued)

FOREIGN PATENT DOCUMENTS

CN 206332831 U 7/2017
CN 207340167 U 5/2018
(Continued)

OTHER PUBLICATIONS

Saramonic MixMic Shotgun Microphone with Integrated 2-Channel Audio Adapter, Filmtools, obtained from Internet before application priority date, 3 pages.
(Continued)

*Primary Examiner* — Carolyn R Edwards
*Assistant Examiner* — Kuassi A Ganmavo
(74) *Attorney, Agent, or Firm* — Banner & Witcoff, Ltd.

(57) ABSTRACT

A microphone having a multi-channel mixer and one or more connectors usable to receive and/or output audio. Any of the connectors may be used as an input connector, as an output connector, or configured to be switchable between being an input and an output connector. The user of the microphone may be able to conveniently use one or more of the connectors to expand the microphone to become part of a larger setup that uses multiple microphones. For example, an XLR connector of the microphone may be passive, and may be configured such that a user can daisy chain the output from an XLR connector of another microphone into
(Continued)

an XLR connector of the microphone. In such an arrangement, an output based on one or both of the microphones may be output through another connector of the microphone, such as a USB connector.

20 Claims, 15 Drawing Sheets

(51) Int. Cl.
 G08B 5/36 (2006.01)
 G10L 19/008 (2013.01)
 H04L 65/75 (2022.01)
 H04R 1/04 (2006.01)
 H04R 3/00 (2006.01)
(52) U.S. Cl.
 CPC ............... *H04R 3/00* (2013.01); *G08B 5/36* (2013.01); *H04L 65/765* (2022.05); *H04R 2420/09* (2013.01); *H04S 2400/01* (2013.01); *H04S 2400/15* (2013.01)
(58) Field of Classification Search
 CPC ........ H04R 1/04; H04R 3/00; H04R 2420/09; G08B 5/36; H04L 12/2807; H04L 65/765
 See application file for complete search history.

(56) References Cited

U.S. PATENT DOCUMENTS

| | | | | |
|---|---|---|---|---|
| 6,512,826 | B1* | 1/2003 | Kim | H04M 1/6075 381/334 |
| 7,599,836 | B2 | 10/2009 | Ichikawa et al. | |
| 8,111,841 | B2 | 2/2012 | Ibe | |
| 8,180,087 | B2 | 5/2012 | Wu | |
| 9,318,086 | B1* | 4/2016 | Miller | G10H 1/057 |
| 2005/0207596 | A1* | 9/2005 | Beretta | H04R 1/04 381/115 |
| 2006/0152398 | A1* | 7/2006 | Jubien | G06F 3/16 341/155 |
| 2006/0222187 | A1 | 10/2006 | Jarrett et al. | |
| 2009/0154722 | A1* | 6/2009 | De Jong | H04R 5/02 381/119 |
| 2012/0300959 | A1 | 11/2012 | Marshall et al. | |
| 2015/0365752 | A1* | 12/2015 | Mcintosh | H04R 1/08 381/122 |
| 2016/0253985 | A1* | 9/2016 | Skillings | H04H 60/05 84/615 |
| 2017/0272513 | A1* | 9/2017 | Arrington | H04L 12/2807 |
| 2017/0337914 | A1* | 11/2017 | Stadius | H04H 60/04 |
| 2020/0162805 | A1* | 5/2020 | Lesso | H03M 1/188 |
| 2020/0233632 | A1* | 7/2020 | Smith | H04W 76/10 |
| 2020/0233633 | A1* | 7/2020 | Van der Mee | H04R 1/04 |

FOREIGN PATENT DOCUMENTS

| | | | | |
|---|---|---|---|---|
| FR | 2832899 | A1* | 5/2003 | ............... H04S 3/00 |
| JP | 4059741 | B2 | 3/2008 | |

OTHER PUBLICATIONS

Is there a hardware-based USB microphone mixer that can take 2 or more USB microphones as input, Quora, obtained from Internet before application priority date, 3 pages.

Can You Record with 2 USB Mirophones into 1 Computer, Microphones, obtained from Internet before application priority date, 13 pages.

\* cited by examiner

MICROPHONE WITH INTEGRATED MULTICHANNEL MIXER

CROSS-REFERENCE TO RELATED APPLICATIONS

The present application claims priority to U.S. provisional patent application Ser. No. 63/152,262, filed Feb. 22, 2021, hereby incorporated by reference in its entirety for all purposes.

BACKGROUND

While a variety of microphones are available on the consumer market, it would be desirable to have a microphone with additional features. For example, many existing microphones have connectors that are suitable for only one purpose, and many existing microphones have limited flexibility in manipulating a plurality of simultaneous audio channels. These limitations can limit the consumer.

SUMMARY

The following summary presents a simplified summary of certain features. The summary is not an extensive overview and is not intended to identify key or critical elements.

Examples of a microphone, and methods for operating and implementing the microphone, are described herein. The microphone may comprise any type of microphone, such as but not limited to a unidirectional microphone, a multidirectional microphone, an omnidirectional microphone, a dynamic microphone, a cardioid dynamic microphone, a condenser microphone, or a MEMS microphone.

According to some aspects, the microphone may comprise multiple types of signal connectors, such as one or more USB connectors and/or one or more XLR connectors, which may be usable with a variety of other devices (e.g., Apple Mac computers and portable devices, Windows PC computers and portable devices, Android devices, XLR mixers and interfaces, etc.). Any of the connectors may be used as an input connector, as an output connector, or configured to be switchable between being an input and an output connector. The user of the microphone may be able to conveniently use one or more of the connectors to expand the microphone to become part of a larger setup that uses multiple microphones. For example, the XLR connector of the microphone may be passive, and may be configured such that a user can daisy chain the output from an XLR connector of another microphone into an XLR connector of the microphone. In such an arrangement, an output based on one or both of the microphones may be output through another connector of the microphone, such as a USB connector.

According to further aspects, the microphone may have a first mode (configuration) in which a first connector (e.g., an XLR connector) is configured as an input connector. In this first mode, circuitry of the microphone may selectively mix a signal (e.g., from another microphone) received via the input connector with a signal based on sound detected by the microphone element of the microphone. The mixed signal may be output via a second connector (e.g., a USB connector). Alternatively, the signal received via the input connector and the signal based on sound detected by the microphone element of the microphone may be separately output via the second connector. The microphone may also have a second mode (configuration) in which the first connector is configured as an output connector. In this second mode, the microphone may output via the output connector a signal based on sound detected by the microphone element of the microphone.

For example, the microphone may have a housing that comprises a first connection port and a second connection port. The housing may at least partially enclose a first microphone element, which is configured to produce a first signal in response to sound. The microphone may further include circuitry that is also at least partially enclosed by the housing. The circuitry may be configured to selectively switch between the first mode or in the second mode. In the first mode, the circuitry may provide a second signal, based on the first signal, to the first connection port. In the second mode, the circuitry may produce a third signal based on the first signal and a fourth signal received via the first connection port. The circuitry may provide the third signal to the second connection port. Any of the first, second, third, and fourth signals may be analog or digital signals.

These and other features and potential advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1:
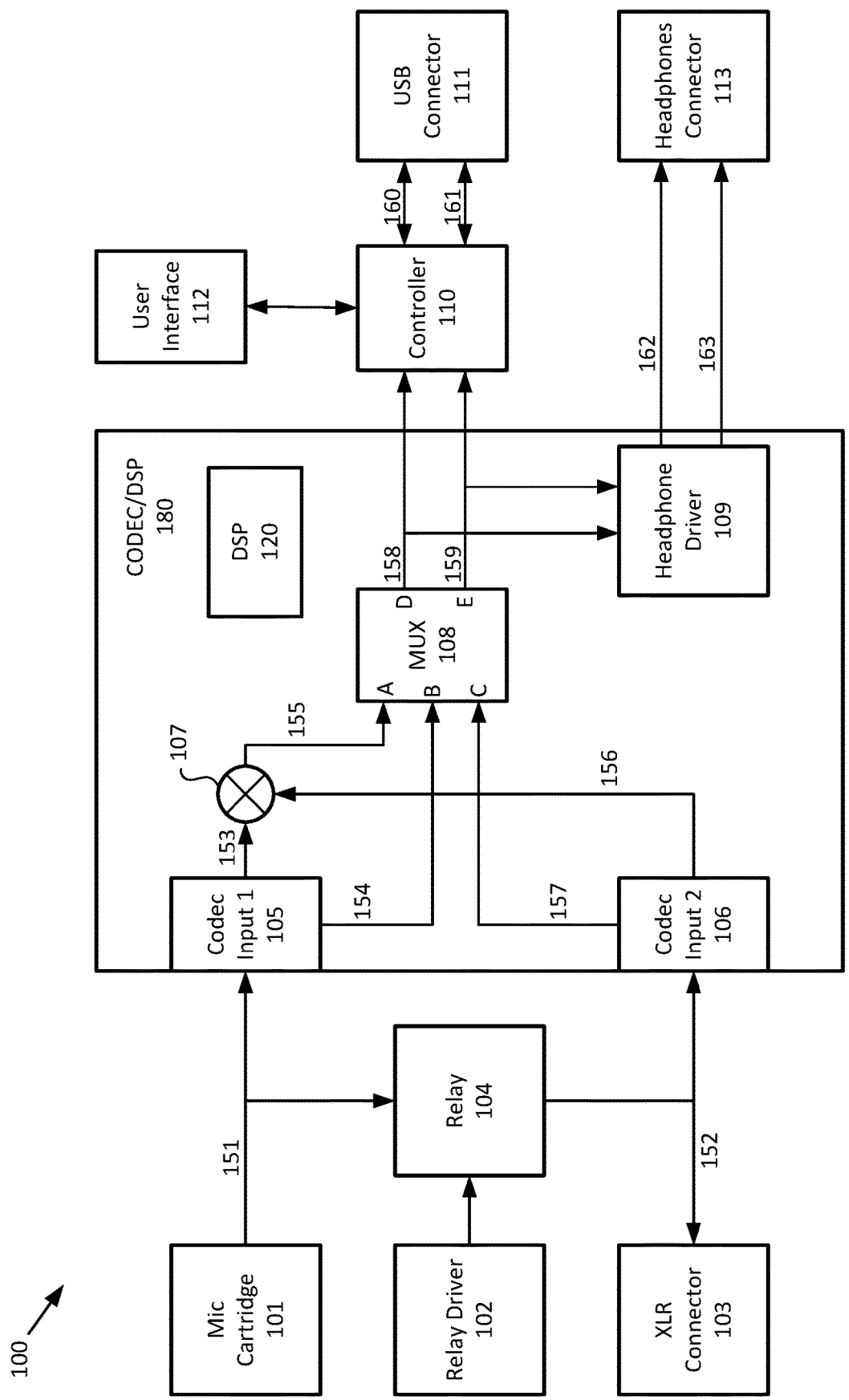
FIG. 1 shows an example block diagram of microphone circuitry in accordance with aspects described herein.

The accompanying drawings, which form a part hereof, show examples of the disclosure. It is to be understood that the examples shown in the drawings and/or discussed herein are non-exclusive and that there are other examples of how the disclosure may be practiced.

FIG. 1 shows an example block diagram of circuitry 100 that may be part of a microphone. Circuitry 100 may include a microphone cartridge 101 that may include one or more microphone elements. The one or more microphone elements may be any type of one or more microphone elements, such as a dynamic element or a condenser element. Microphone cartridge 101 may output in response to detected sound, via a circuit node 151, an electrical signal representing the detected sound to a coder-decoder (codec) input 1 (element 105).

Circuitry 100 may also include at least one connector, such as an XLR connection 103, that may provide an electrical signal to a codec input 2 (element 106) received from an external device.

Figure 3A:
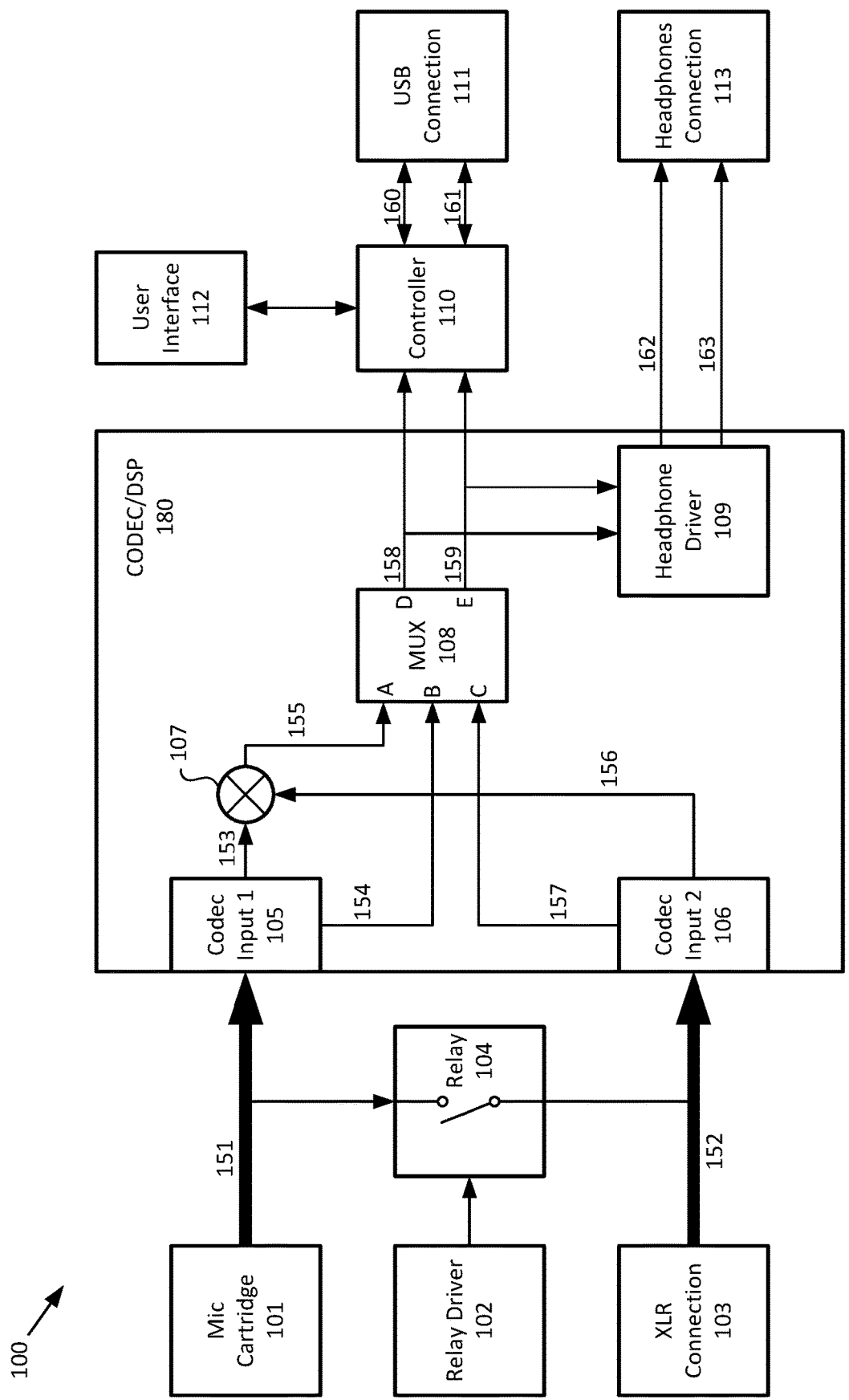
FIGS. 3A-3F show example configurations of the microphone of FIG. 1 in accordance with aspects described herein.
Figure 3B:
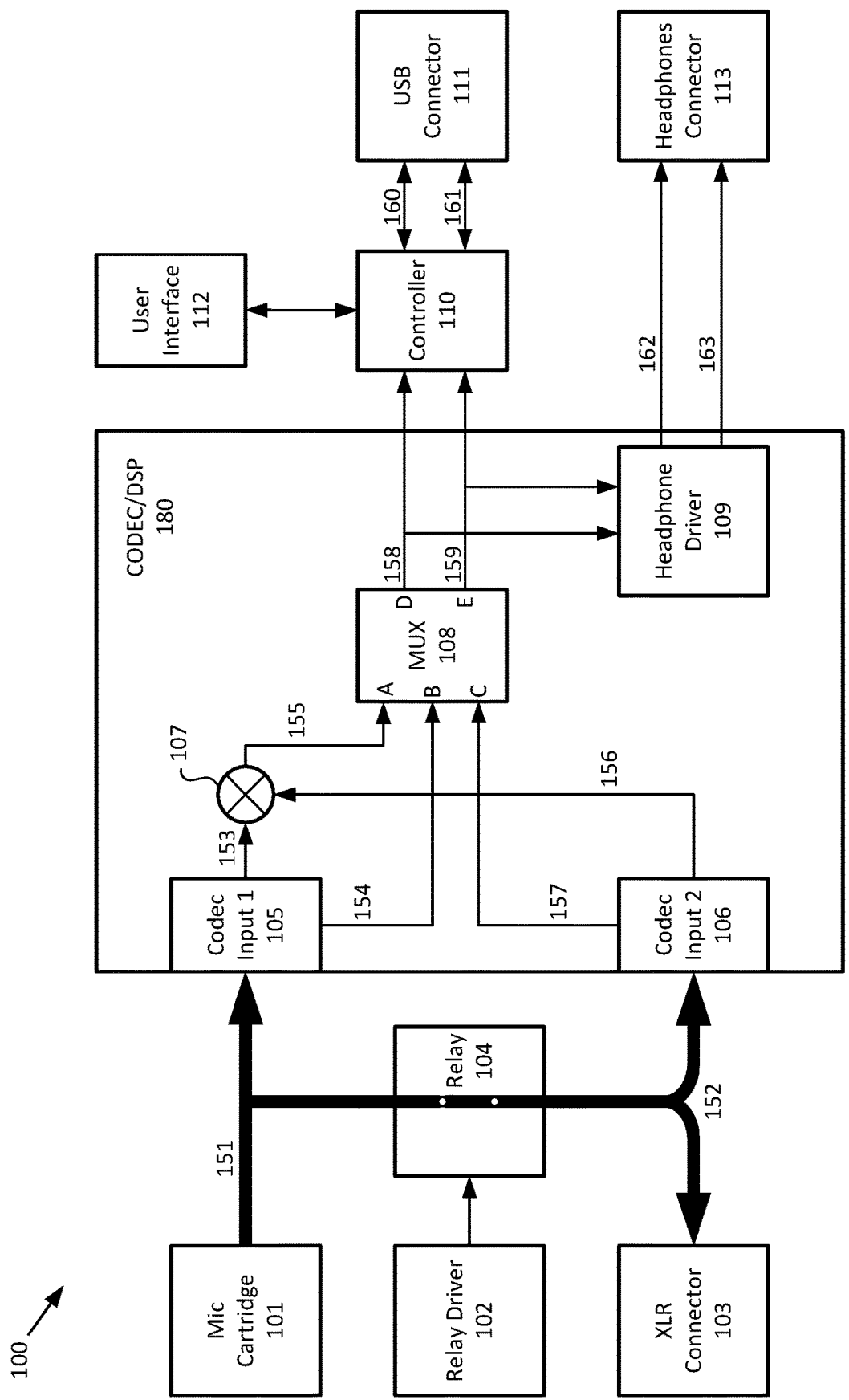

Circuitry 100 may also include a relay driver 102 and a relay 104, in which the relay driver 102 may be configured to selectively cause relay 104 to switch between a first state and a second state. In the first state, relay 104 may electrically disconnect circuit node 151 from circuit node 152 such that the electrical signal output by microphone cartridge 101 is received by codec input 1, but not by XLR connection 103 or by codec input 2. In the first state, therefore, the output of microphone cartridge 101 may be received by codec input 1 (and not by codec input 2 and/or not by XLR connection 103), and a signal from XLR connection 103 may be received by codec input 2. An example signal flow in the first state is shown in FIG. 3A. In the second state, relay 104 may electrically connect circuit node 151 with circuit node 152, such that the electrical signal output by microphone cartridge 101 passes through relay 104 and is thus received not only by codec input 1, but also by XLR connection 103 and/or codec input 2. Moreover, in the second state, XLR connection 103 may or may not still be connected with codec input 2. An example signal flow in the second state is shown in FIG. 3B.

Codec input 1 and codec input 2 may be part of a same integrated device, such as a codec and/or digital signal processor (DSP) 180. Codec/DSP 180 may also include a mixer 107, a multiplexer (MUX) 108, and/or a headphone driver 109 (which may be connected to a headphone connection 113 such as a 3.5 mm TRRS connector). Alternatively, one or more of these elements 105-109 may be part of a separate device (e.g., a separate integrated circuit or other type of circuitry).

Circuitry 100 may also include at least one controller 110 such as a microcontroller unit (MCU), which may be connected with a user interface 112 and/or one or more physical connectors such as a universal serial bus (USB) connection 111.

Any portion of circuitry 100 may be implemented, for example, as one or more programmable gate arrays (PGAs), one or more application-specific integrated circuits (ASICs), one or more commercial off-the-shelf integrated circuits, and/or any other types of circuitry. For example, codec/DSP 180 and/or controller 110 each may be implemented as one or more PGAs chips, one or more ASICs, one or more processors, a non-transitory computer-readable medium such as one or more memories storing instructions for execution by the one or more processors, etc.

In the shown example, codec input 1 may receive, via electrical node 151, an electrical signal from microphone cartridge 101, such as an analog electrical signal, that is generated in response to sound detected by microphone cartridge 101. Codec input 1 may include an analog-to-digital converter (ADC) that converts the received analog electrical signal into a digital signal. The generated digital signal may be forwarded, via electrical node 153, to mixer 107. The generated digital signal from codec input 1 may also be forwarded, via electrical node 154, to a first input of multiplexer 108 (in this example, input B of multiplexer 108).

Similarly, in the shown example, codec input 2 may receive, via electrical node 152, an electrical signal from XLR connection 103 and/or from microphone cartridge 101, such as an analog electrical signal. Codec input 2 may also include an ADC (which may be the same ADC as for codec input 1) that converts the analog electrical signal received by codec input 2 into a digital signal. The digital signal produced in response to the analog signal received by codec input 2 may be forwarded, via electrical node 156, to a second input of mixer 107. The generated digital signal from codec input 2 may also be forwarded, via electrical node 157, to another input of multiplexer 108 (in this example, input C of multiplexer 108).

Mixer 107 may be a digital mixer and may selectively mix the digital signals received via electrical nodes 153 and 156 to produce a digital signal that is provided to a third input of multiplexer 108 (in this example, input A of multiplexer 108) via an electrical node 155. Mixer 107 may selectively mix the input digital signals in any of a plurality of ways. For example, mixer 107 may generate the digital signal on electrical node 155 to be based on any desired ratio of the two input signals on electrical nodes 153 and 156, such as mixing them at 50% each (50/50 ratio), or one at 25% and the other at 75% (25/75 or 75/25 ratio), one at 10% and the other at 90% (10/90 or 90/10 ratio), or even one at 0% and the other at 100% (a 0/100 or 100/0 ratio). These ratios are merely examples, and any other values may be used. Thus, for example, if mixer 107 is configured to mix the two inputs at a 50/50 ratio, then the signal at electrical node 155 may be generated by mixing the inputs at electrical nodes 153 and 156 using equal weighting. Or, if mixer 107 is configured to mix the two inputs at a 25/75 ratio, then the signal at electrical node 155 may be generated by mixing the inputs at electrical nodes 153 and 156 in which one of the inputs is weighted at 25% and the other of the inputs is weighted at 75%. Mixer 107 may be a single-channel mixer or a multi-channel (e.g., stereo) mixer. In other words, where mixer 107 is a single-channel mixer, output node 155 may carry only a single (mono) audio channel. Where mixer 107 is a multi-channel mixer, output node 155 may actually be two or more physical electrical nodes each carrying a different one of the multiple channels (e.g., a left audio channel and a right audio channel).

Multiplexer 108 may be configured to selectively multiplex any one or more of a plurality of inputs (e.g., inputs A, B, and/or C) such that the signals received at any one or more of the inputs are selectively output by any one or more of a plurality of outputs (e.g., outputs D and/or E). Where two outputs are used, outputs D and E may be considered to be, respectively, a left audio channel and a right audio channel. The left and right audio channels may be sent, via electrical nodes 158 and 159, to inputs of controller 110 and/or to inputs of headphone driver 109. Multiplexer 108 may or may not be included in circuitry 100. Where multiplexer 108 is not included, the output (node 155) of mixer 107 may be connected directly to node 158 and/or node 159. For example, where mixer 107 is a stereo mixer, node 155 may actually be two physical electrical nodes, one of which is connected to node 158 (e.g., left audio channel) and the other of which is connected to node 159 (e.g., right audio channel), with or without an intervening multiplexer 108 making the connections.

User interface 112 may include any one or more devices with which the user of the microphone may interact. For example, user interface 112 may include one or more buttons, switches, sliders, and/or touch sensors. User interface 112 may also include one or more drivers that interface with controller 110 so that user inputs via user interface 112 may be communicated as signals to controller 110. User interface 112 may be at least partially accessible by the user from outside a body (e.g., housing) of the microphone. User interface 112 may also provide information to the user, such as in the form of a display, one or more lights (e.g., light-emitting diodes), and/or a haptic feedback motor. The information provided to the user via user interface 112 may be controlled by controller 110.

Codec/DSP 180 may also comprise circuitry for processing audio, for example one or more equalizers such as a high pass/presence boost equalizer and/or a mode equalizer, a de-esser, a bass equalizer such as a bass tamer (which may be used to reduce the proximity effect), a limiter, a compressor, and/or an automatic level control (ALC). This digital signal processing functionality is schematically indicated in FIG. 1 as DSP 120. DSP 120 may be connected anywhere in the audio signal chain. For example, DSP 120 may perform digital signal processing on audio signals in any one or more of nodes 153-159.

Figure 2:
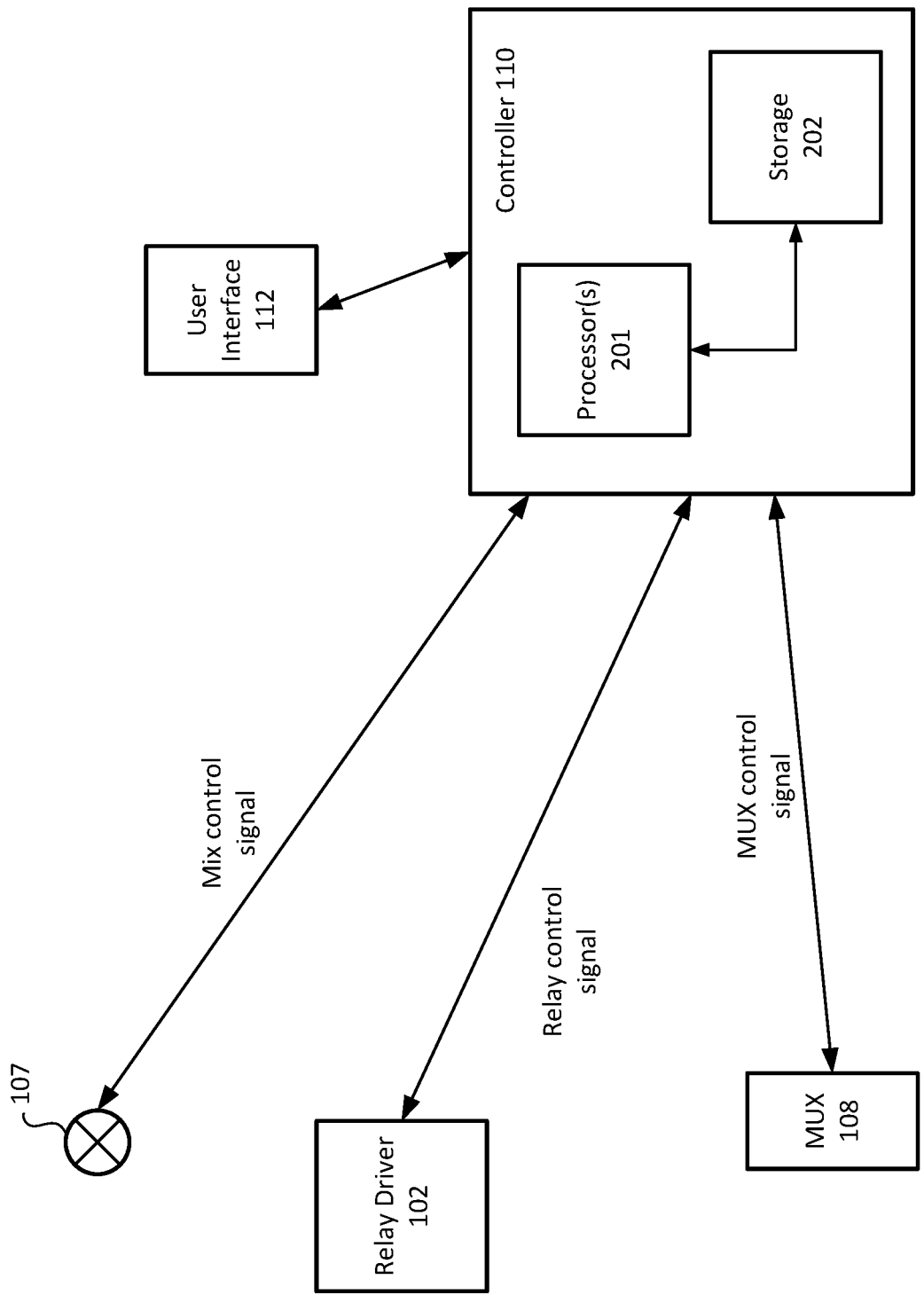
FIG. 2 shows an example of elements of the microphone of FIG. 1 that may be controlled by the microphone's controller in accordance with aspects described herein.

Referring to FIG. 2, controller 110 may control, and/or communicate uni-directionally or bi-directionally with, one or more elements of circuitry 100, as indicated by the arrows connecting controller 110 with relay driver 102, mixer 107, multiplexer 108, and user interface 112. For example, controller 110 may send a relay control signal to relay driver 102 indicating, or otherwise being associated with, which state relay 104 should be in, thereby controlling whether relay 104 is in the above-described first state or second state. In response to the relay control signal, relay driver 102 may control relay 104 to be in the first state or the second state, such as by selectively applying an appropriate current to relay 104 to cause a circuit within relay 104 to close or open, thereby connecting or disconnecting node 151 with node 152. Controller 110 may further send a mix mode control signal to mixer 107 indicating a mix mode. For example, the mix mode control signal may identify, or otherwise be associated with, a particular mixing ratio between the signals that mixer 107 receives from codec 1 and codec 2. Mixer 107 may adjust the mixing mode in accordance with the mix control signal. Controller 110 may also send a MUX control signal to multiplexor 108 that indicates, or otherwise is associated with, a particular multiplexing mode. Multiplexer 108 may apply the multiplexing mode based on the MUX control signal. For example, the MUX control signal may indicate that input A of multiplexor 108 is to be connected to outputs D and E. Or, for example, the MUX control signal may indicate that input B is to be connected to output E and input C is to be connected to output E. MUX control signal may indicate any multiplexor input/output connections as desired. Some examples of multiplexor input/output connections are described below with reference to FIGS. 3C-3E.

Controller 110 may send any of the mix control signal, the relay control signal, and/or the MUX control signal based on a user input received from user interface 112. Controller 110 may additionally or alternatively send any of the mix control signal, the relay control signal, and/or the MUX control signal based on an algorithm executed by controller 110, either based on or independent from any user inputs received from user interface 112. For example, controller 110 may comprise one or more processors 201. Controller 110 may further comprise storage 202, which may comprise a non-transitory computer-readable medium, such as one or more memories, that stores instructions for performing the algorithm in order to perform any of the functions described herein attributed to controller 110. The one or more processors 201 may execute the stored instruction to perform these functions. In further examples, some or all of the functionality of controller 110 may be additionally or alternatively implemented as hard-wired circuitry and/or as firmware.

FIG. 3A shows an example configuration of circuitry 100, in which relay 104 is in the above-described first state, such that relay 104 does not electrically connect node 151 with node 152. As indicated in FIG. 3A by the thicker arrows, a signal from microphone cartridge 101 may be received by codec input 1, and a signal from XLR connection 103 may be received by codec input 2. In this first state, XLR connection 103 may act as an input connection that receives signals from an external device connected to circuitry 100 via XLR connection 103. Relay 104, and any other circuitry as desired, may be configured to achieve the first state in response to one or more control signals received by controller 110. For example, controller 110 may send a relay control signal to relay driver 102 (such as shown in FIG. 2), which in response may cause relay 104 to switch to the first state (e.g., by opening relay 104).

FIG. 3B shows an example configuration of circuitry 100, in which relay 104 is in the above-described second state, such that relay 104 electrically connects node 151 with node 152. As indicated in FIG. 3B by the thicker arrows, a signal from microphone cartridge 101 may be received by codec input 1, by codec input 2, and by XLR connection 103. In this second state, XLR connection 103 may act as an output connection that sends signals from microphone cartridge 101 to an external device connected to circuitry 100 via XLR connection 103. Relay 104, and any other circuitry as desired, may be configured to achieve the second state in response to one or more control signals received by controller 110. For example, controller 110 may send a relay control signal to relay driver 102 (such as shown in FIG. 2), which in response may cause relay 104 to switch from the first state to the second state (e.g., by closing relay 104) or from the second state to the first state (e.g., by opening relay 104). As another example, the second state may be the default unpowered state of relay 104, which may allow microphone cartridge 101 to function as a passive microphone outputting to XLR connector 103 (and/or any other desired connector) when circuitry 100 is unpowered. For example, relay 104 may be a normally-closed (NC) relay, and may comprise a spring that biases a switch contact point within relay 104 to be in the closed (second) state by default when unpowered by relay driver 102. Circuitry 100 may be selectively switched back and forth, as desired, between the first state (such as in FIG. 3A) and the second state (such as in FIG. 3B).

Figure 3C:
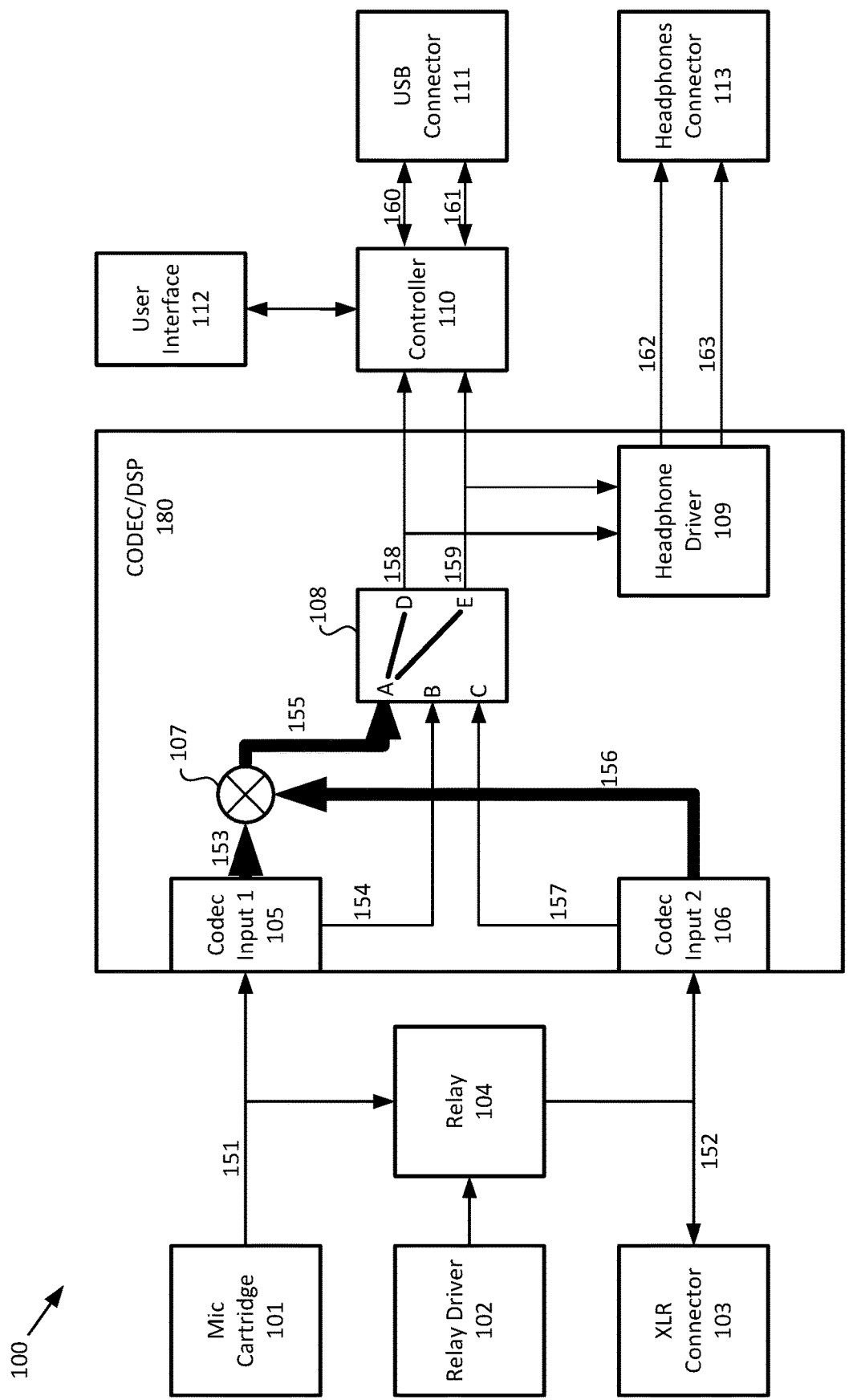

FIGS. 3C-3F show various example configurations of Codec/DSP 180, in which mixer 107 and multiplexer 108 are configured in various ways to combine and multiplex audio signals from codec input 1 and codec input 2. In particular, FIG. 3C shows an example configuration in which mixer 107 is configured to combine audio signals from codec input 1 and codec input 2 to produce a signal at node 155 that is provided to input A of multiplexer 108. In such a configuration, the audio signals from codecs 1 and 2 (which may be digital audio signals) may be combined together using any algorithm and using any weights. For example, the signal output by mixer 107 at node 155 may be a weighted average of the audio signals from codec inputs 1 and 2, according to the following relationship: MixOut=X*Codec1+Y*Codec2, where MixOut is the audio signal output by the mixer 107 at node 155, Codec1 is the audio signal provided by codec input 1 at node 153, Codec2 is the audio signal provided by codec input 2 at node 156, and X and Y are any desired amplitude values in the range of from zero to one, inclusive, to achieve a desired mixing ratio (e.g., a mixing ratio of X/Y or Y/X). Where the audio signals are digitally encoded, the actual combining algorithm implanted may take the encoding into account to mix the two signals in the desired mixing ratio. FIG. 3C also shows an example configuration of multiplexer 108 in which input A is multiplexed to (e.g., distributed to) both output D and output E (as indicated by the lines conceptually showing connections from input A to outputs D and E). In such a configuration, where outputs D and E respectively correspond to left and right audio channels, the audio output by multiplexer 108 may be in mono mode in which both left and right audio channels are identical.

Figure 3D:
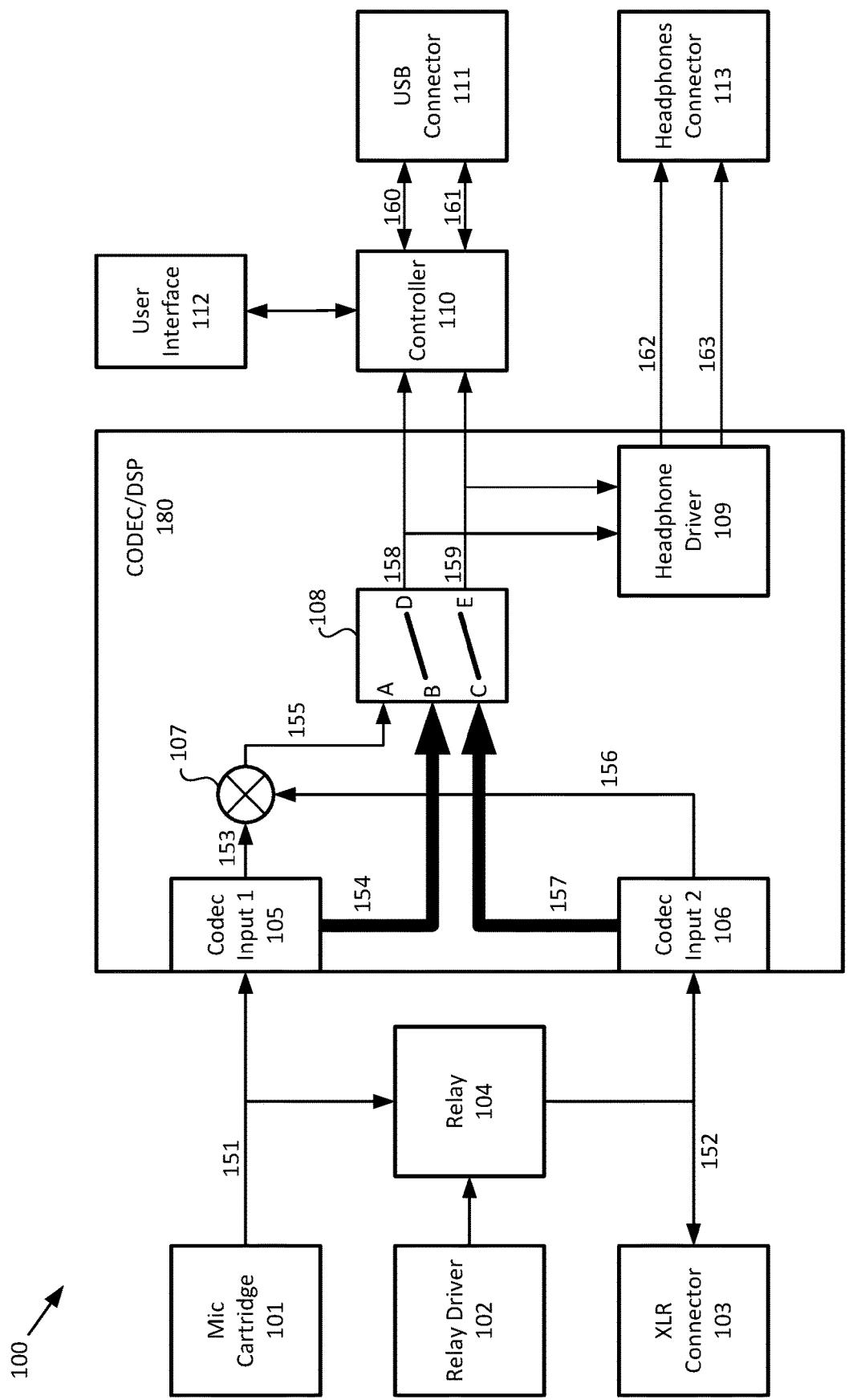

FIG. 3D shows another example configuration in which mixer 107 is bypassed and instead codec input 1 and codec input 2 are directly provide to inputs B and C, respectively, of multiplexer 108. In this particular configuration codec input 1 may provide audio for the left audio channel (at output D/node 158) and codec input 2 may provide audio for the right audio channel (at output D/node 159).

Figure 3E:
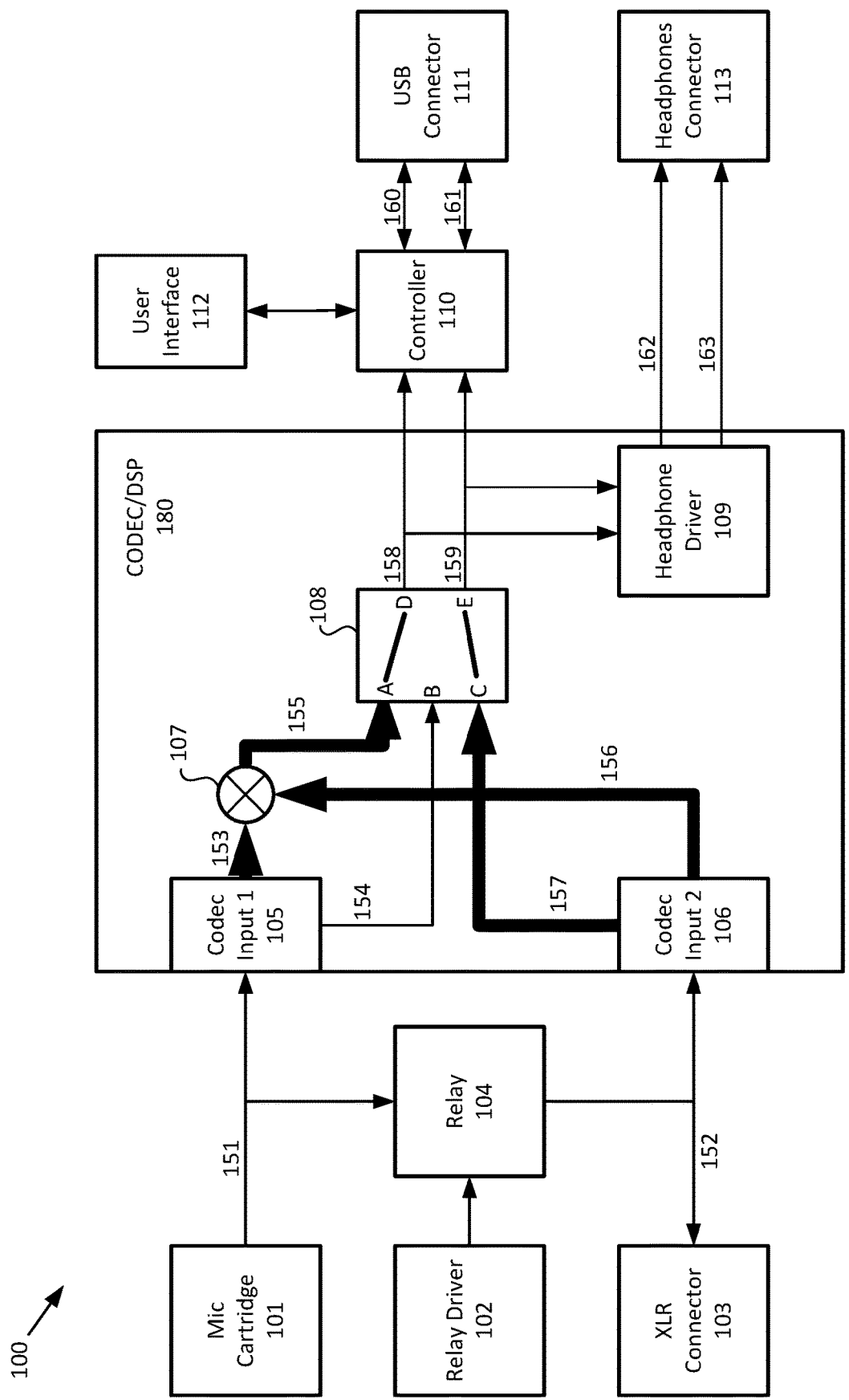

FIG. 3E shows another example configuration in which mixer 107 mixes audio signals received from codec input 1 and codec input 2 (which may be mixed, for example, in the manner described above for FIG. 3C) and outputs the resulting mixed signal into multiplexer input A. This mixed audio signal may be passed through to output D of multiplexer 108 (e.g., as the left audio channel). At the same time, the audio signal from codec input 2 may also be provided to multiplexer input C, which may be passed to multiplexer output E (e.g., as the right audio channel).

Figure 3F:
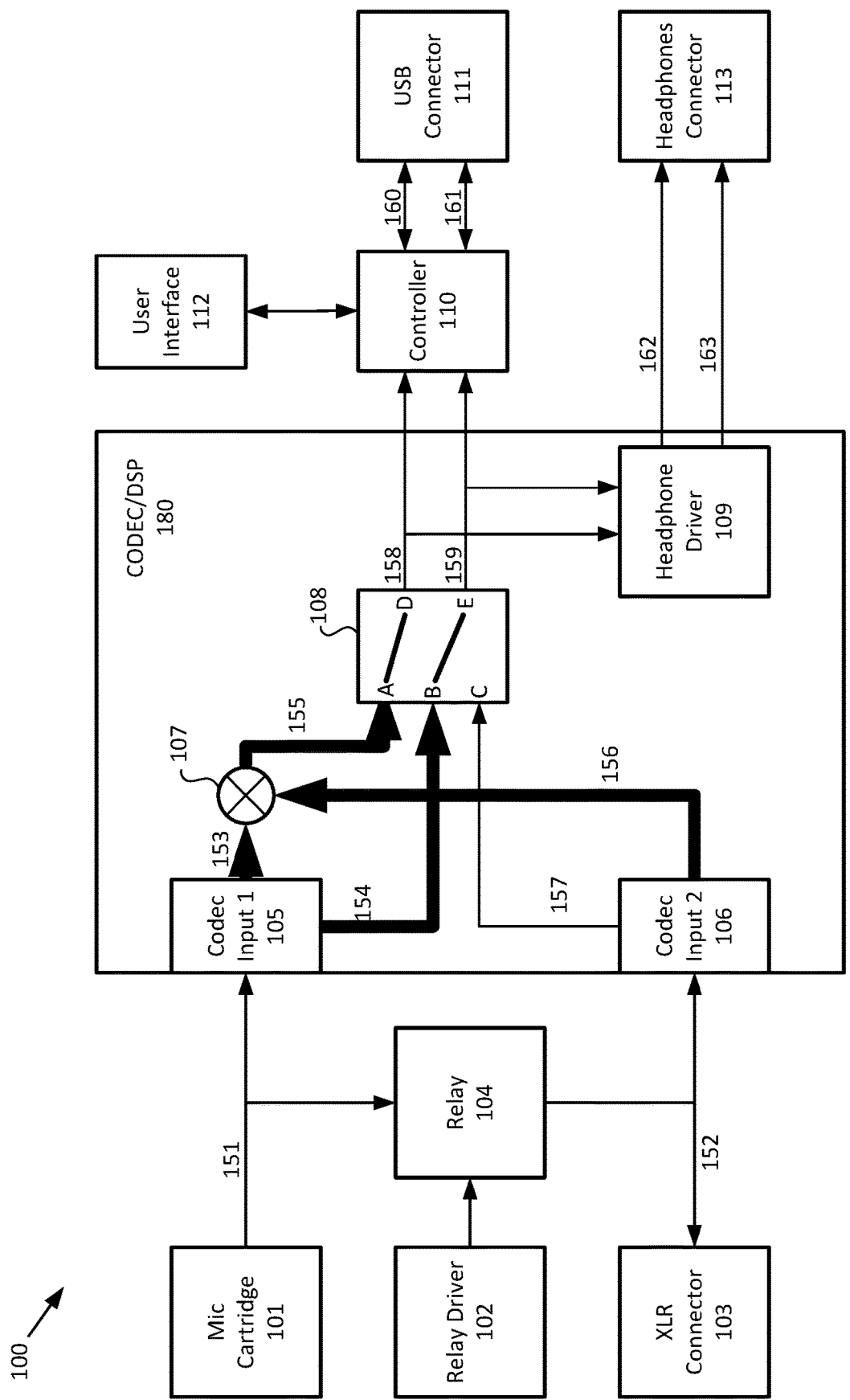

FIG. 3F shows another example configuration in which mixer 107 mixes audio signals received from codec input 1 and codec input 2 (which may be mixed, for example, in the manner described above for FIG. 3C) and outputs the resulting mixed signal into multiplexer input A. This mixed audio signal may be passed through to output D of multiplexer 108 (e.g., the left audio channel). At the same time, the audio signal from codec input 1 (via node 154) may also be provided to another multiplexer input B, which may be passed to another multiplexer output E (e.g., as the right audio channel). Alternatively, at the same time that signals are being mixed by mixer 107, the audio signal from codec input 2 (via node 157) may be provided to another multiplexer input B, which may be passed to multiplexer output E (e.g., as the right audio channel).

FIGS. 3C-3F indicate only a subset of the possible configurations of Codec/DSP 180 and are not intended to be limiting. Codec input 1 105, codec input 2 106, mixer 107, and multiplexer 108 may be configured to provide any desired interconnections amongst these elements, and to achieve any desired mixing of audio signals therein, as desired. Moreover, any configuration of Codec/DSP 180 may be combined with any configuration of other portions of circuitry 100. For example, relay 104 may be in either state (as shown in FIGS. 3A and 3B) in combination with any of the configurations of Codec/DSP 180, to achieve a desired set of audio inputs, audio outputs, and mixing and multiplexing thereof.

Figure 4:
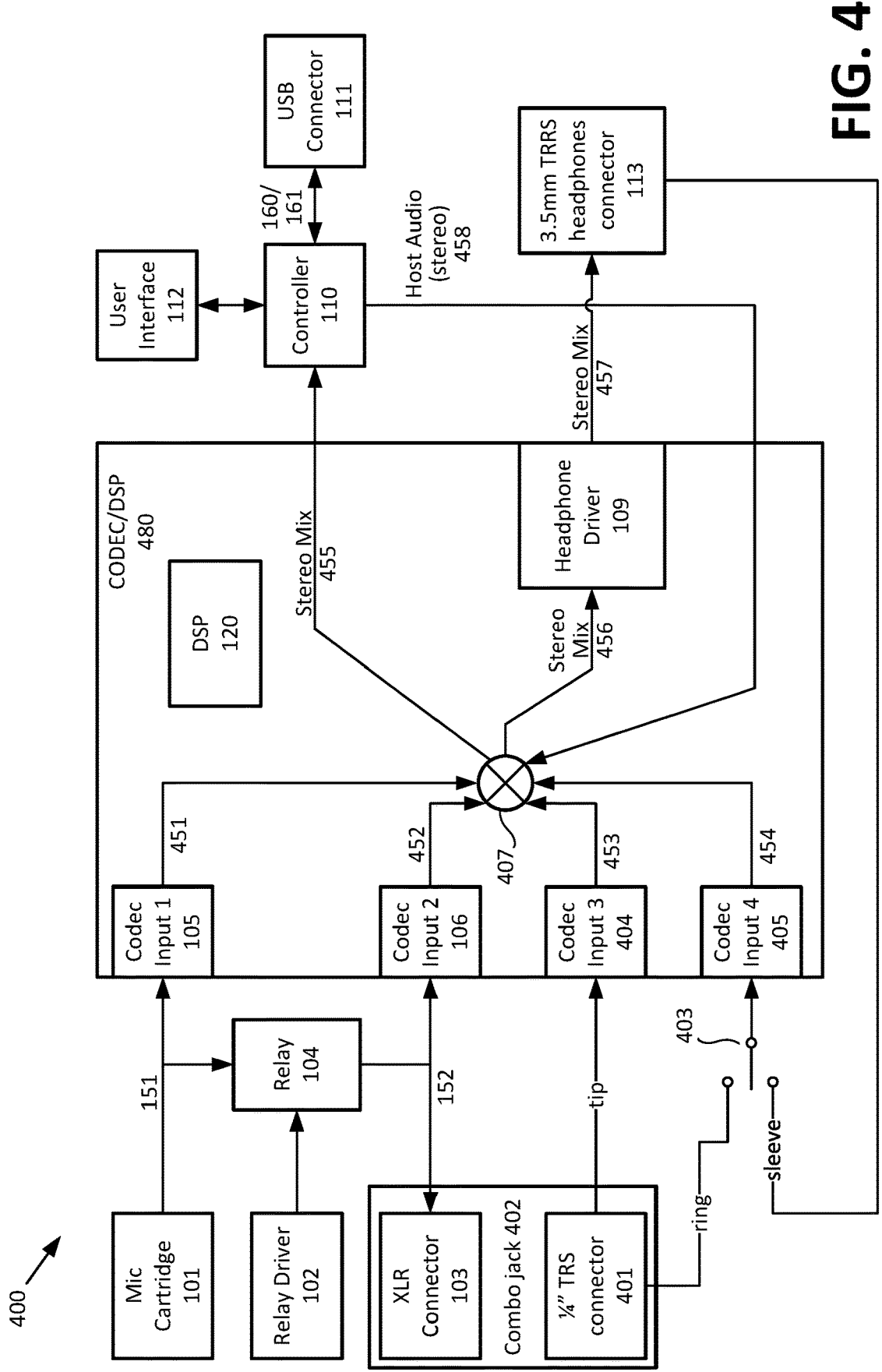
FIG. 4 shows another example block diagram of an microphone circuitry in accordance with aspects described herein.

FIG. 4 shows another example block diagram of circuitry 400 that may be part of a microphone. Circuitry 400 may comprise one or more of the elements of circuitry 100 (FIG. 1), for example microphone cartridge 101, relay driver 102, XLR connector 103, relay 104, codec input 1 105, codec input 2 106, headphone driver 109, controller 110, USB connector 111, user interface 112, and/or headphones connector 113. Each of these elements may operate in the same way, or in substantially the same way, as described above with reference to FIGS. 1, 2, and 3A-3F.

Circuitry 400 may further comprise a Codec/DSP 480, which may be, for example, Codec/DSP 180 configured in a different way. Codec/DSP 480 may comprise one or more codec inputs in addition to codec input 1 and codec input 2. For example, codec/DSP 480 may comprise four codec inputs, five codec inputs, six codec inputs, or more. In the shown example, codec/DSP 480 comprises four codec inputs: codec input 1 105, codec input 2 106, codec input 3 404, and codec input 4 405.

XLR connector 103 may be part of a combo (combination) jack 402 along with another type of connector such as a quarter-inch tip-ring-sleeve ("TRS") connector 401. Where headphone connection 113 comprises a TRRS connector, the tip node of TRS connector 401 may provide an input to codec input 3, and the ring node of TRS connector 401 and the sleeve node of TRRS connector 113 may selectively provide an input to codec input 4, depending upon the state of a switch 403. In a first state of switch 403, the ring node of TRS connector 401 may connect to codec input 4, and in a second state of switch 403, the sleeve node of TRRS connector 113 may connect to codec input 4. The state of switch 403 may be controlled by controller 110 based on which type of connector is providing an input signal, i.e., based on whether controller 110 detects the presence of a quarter-inch TRS input or a 3.5 mm TRRS configured input (via 3.5 mm TRRS headphones connector 113). The 3.5 mm connector and the quarter-inch connector may be independent to each other and may be populated at the same time. These type of connectors often have mechanical switches to indicate that a connector is inserted. Combo jack 402 may be an XLR quarter-inch combo jack in which, for example, either an XLR connector or a quarter-inch connector can be populated at once.

For simplicity and ease of viewing, FIG. 4 schematically represents certain stereo audio signals or nodes as a single line, such as stereo mix 455, stereo mix 456, stereo mix 457, and host audio 458. Each of these stereo mixes may comprise two audio channels: a left channel and a right channel. The host audio signal (line 458) may be generated by controller 110 based on signals received via nodes 160 and 161 and via USB connector 111 from another device.

Codec/DSP 180 may also include a mixer and/or a multiplexer, similar to elements 107 and 108 in FIG. 1. For example, FIG. 4 shows a mixer 407, which may be, or may be similar to, mixer 107. While a multiplexer is not explicitly shown in FIG. 4 (for simplicity and ease of viewing), mixer 407 may comprise both a mixer function and a multiplexer function, such as the same type of multiplexing as performed by MUX 108.

Like mixer 107, mixer 407 may comprise a digital mixer and may selectively mix the digital signals received via electrical nodes/lines 451, 452, 453, 454, and/or 458 to produce one or more digital signals (e.g., stereo mixes via lines 455 and/or 456). Mixer 407 may selectively mix the input digital signals in any of a plurality of ways. For example, mixer 407 may generate an output digital signal to be based on any desired ratio of the two or more input signals, such as mixing them in some specific ratio (e.g., a 50/50 ratio or a 25/75 ratio for two input signals, or a 25/25/50 ratio or a 40/35/25 ratio for three input signals). These ratios are merely examples, and any other values from 0% to 100% may be used.

Thus, mixer 407 may receive any one or more audio signals via any one or more of nodes/lines 451-454 and/or 458, mix and/or otherwise combine them as desired, and output one or more resulting audio signals via nodes/lines 455 and/or 456. For example, mixer 407 may provide a left channel of a stereo mix based on any one of the codec inputs (e.g., codec input 1) and a right channel of the stereo mix based on any other of the codec inputs (e.g., code input 3). As another non-limiting example, mixer 407 may provide a left channel a stereo mix based on any two or more of the codec inputs (e.g., codec input 1 mixed in a first way with codec input 3) and a right channel of the stereo mix based on any one or more of the codec inputs (e.g., code input 2 mixed in a second way with codec input 3). In these examples or in any other configuration, the left and/or right channels produced by mixer 407 may be additionally or alternatively based on the host audio (line 458) received from controller 110. Thus, the stereo mix generated by mixer 407 may be based on any one or more of the codec inputs 1-4 and/or based on the host audio (line 458) provided by an external device via USB connector 111.

If a multiplexer were schematically shown as separate from mixer 407 in FIG. 4, such a multiplexer may be schematically shown as having two or more inputs that receive outputs from any or all of codecs 1-4, from host audio (line 458), and/or that receives any other desired intermediary signals generated by mixer 407. Such a multiplexer may also be schematically shown as being configured to selectively multiplex any of those inputs in any combination or subcombination to produce one or more outputs, which may be output to stereo mixes in lines 455 and/or 456.

Codec/DSP 480 may also comprise DSP 120. DSP 120 may be connected anywhere in the audio signal chain. For example, DSP 120 may perform digital signal processing on audio signals in any one or more of nodes/lines 451-456 and/or 458.

Like circuitry 100, any portion of circuitry 400 may be implemented, for example, as one or more PGAs, one or more ASICs, one or more commercial off-the-shelf integrated circuits, and/or any other types of circuitry. For example codec/DSP 480 and/or controller 110 each may be implemented as an integrated circuit chip.

Figure 5:
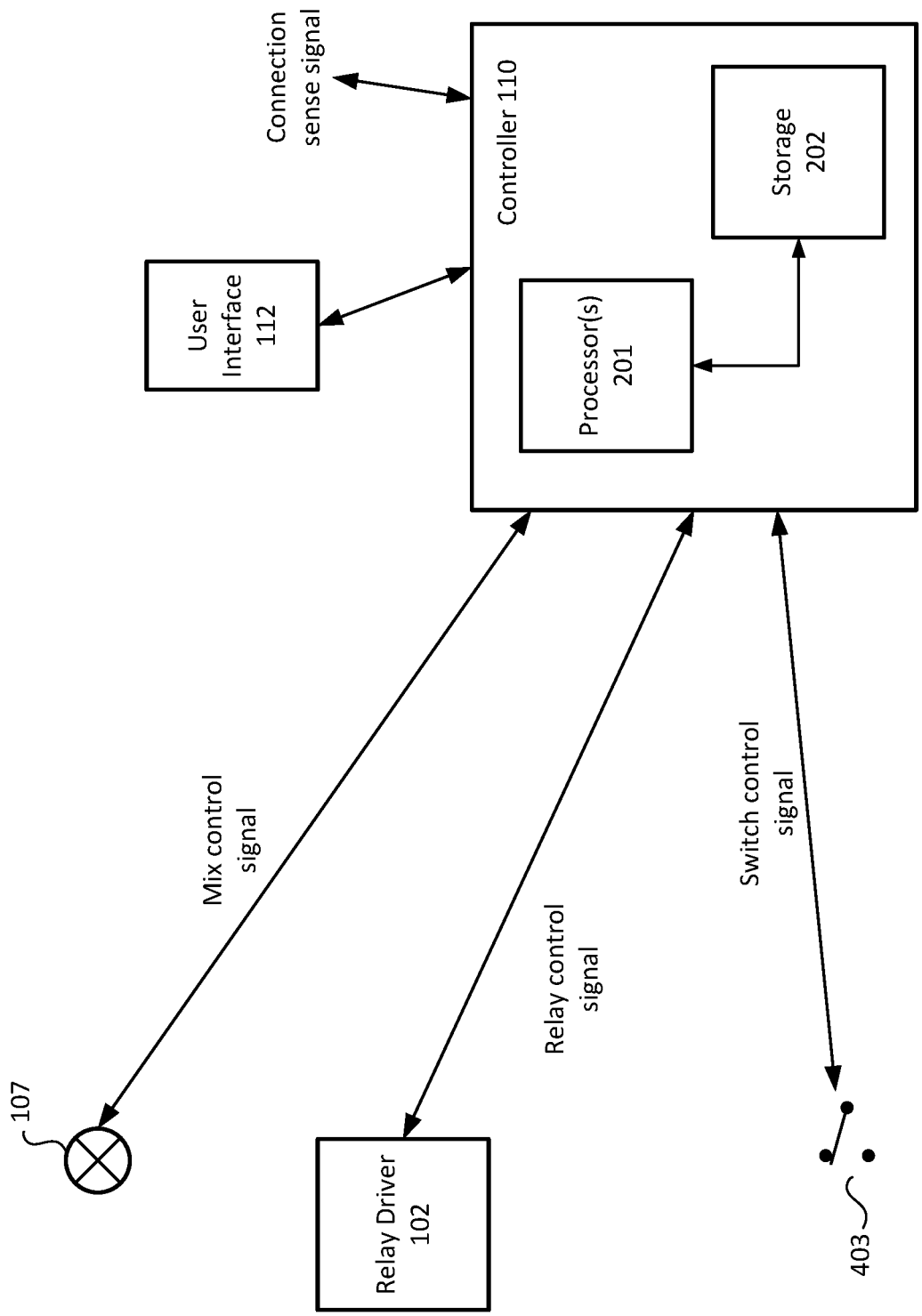
FIG. 5 shows an example of elements of the microphone of FIG. 4 that may be controlled by the microphone's controller in accordance with aspects described herein.

Referring to FIG. 5, controller 110 may control, and/or communicate uni-directionally or bi-directionally with, one or more elements of circuitry 400, as indicated by the arrows connecting controller 110 with relay driver 102, mixer 407, switch 403, and user interface 112. As previously discussed with regard to circuitry 100, controller 110 as part of circuitry 400 may send a relay control signal to relay driver 102 indicating, or otherwise being associated with, which state relay 104 should be in, thereby controlling whether relay 104 is in the above-described first state or second state. In response to the relay control signal, relay driver 102 may control relay 104 to be in the first state or the second state, such as by selectively applying an appropriate voltage to relay 104 to cause a circuit within relay 104 to close or open, thereby connecting or disconnecting node 151 with node 152. Controller 110 may further send a mix mode control signal to mixer 407 indicating a mix mode and/or a multiplexing configuration. For example, the mix mode control signal may identify, or otherwise be associated with, a particular mixing ratio between the signals that mixer 407 receives from codec 1, codec 2, codec 3, codec 4, and/or host audio (via line 458). Mixer 407 may adjust the mixing mode in accordance with the mix control signal. Mix control signal may also indicate a multiplexing mode that indicates, or is otherwise associated with, which signals received by mixer 407 and/or generated by mixer 407 are to be multiplexed, and how they are to be multiplexed prior to outputting as stereo mixes 455 and/or 456. Mixer 407 may apply the multiplexing mode based on the mix control signal. For example, the mix control signal may indicate that one or more particular inputs of the multiplexing portion of mixer 407 is to be connected with one or more outputs of mixer 407.

Figure 9:
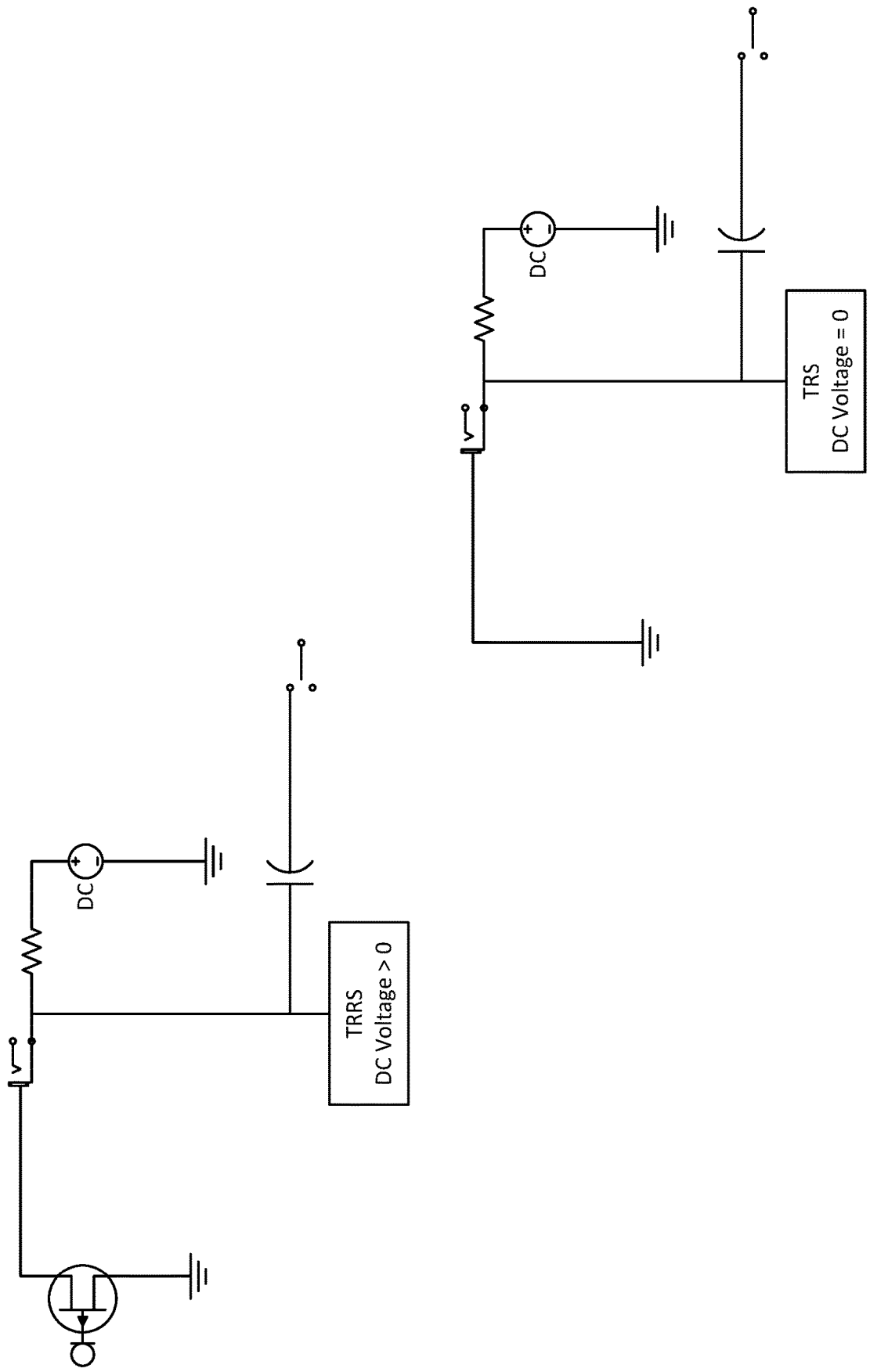
FIG. 9 shows schematics of example circuitry that may be used to determine whether a TRRS connector is connected to the microphone and whether a TRS connector is connected to the microphone.

Controller 110 may further determine which type of connector is plugged into combo jack 402. For example, circuitry 400 may receive a connection sense signal that is indicative of whether combo jack 402 is receiving a quarter-inch TRS connector or headphone connection 113 is receiving a 3.5 mm TRRS connector from an external device. The connection sense signal may comprise one or more signals actively received from the external device via the sleeve or tip nodes, and/or it may be one or more separately generated signals such as from a sensor that physically senses the type of connector being plugged in. For example, FIG. 9 shows schematics of example circuitry that may be used by controller 110 to indicate whether a TRRS connector is inserted or a TRRS connector is inserted. A similar principle may be used for determining whether the inserted quarter-inch connector is a TRS connector or a TS connector. The voltage at the "sleeve" pin of 3.5 mm TRRS or "ring" of the quarter-inch jack may be measured via, for example, a comparator or other voltage sensing circuitry. The output(s) of the comparator(s) and/or other voltage sensing circuitry may constitute the connection sense signal made available to controller 110. The circuitry of FIG. 9 may be part of controller 110 or separate from (and connected to) controller 110.

Based on which type of connector is determined to be plugged in, controller 110 may control (e.g., by sending a switch control signal to) switch 403 to be in a first state or a second state. If controller 110 determines that a quarter-inch TRS connector is connected, then controller 110 may control switch 403 to switch to a first state that connects the ring node of combo jack 402 to codec input 4. If controller 110 determines that a 3.5 mm TRRS connector is connected, then controller 110 may control switch 403 to switch to a second state that connects the sleeve node of TRRS connector 113 to codec input 4. Alternatively, switch 403 may be controlled by controller 110 based on a user input via user interface 112.

In general, controller 110 may send any of the mix control signal, the relay control signal, and/or the switch control signal based on a user input received from user interface 112. controller 110 may additionally or alternatively send any of the mix control signal, the relay control signal, and/or the MUX control signal based on an algorithm executed by controller 110, either based on or independent from any user inputs received from user interface 112. As described previously with respect to FIG. 2, the algorithm may be implemented as hardwired circuitry, firmware, and/or by executing instructions stored in a computer-readable medium.

Figure 6A:
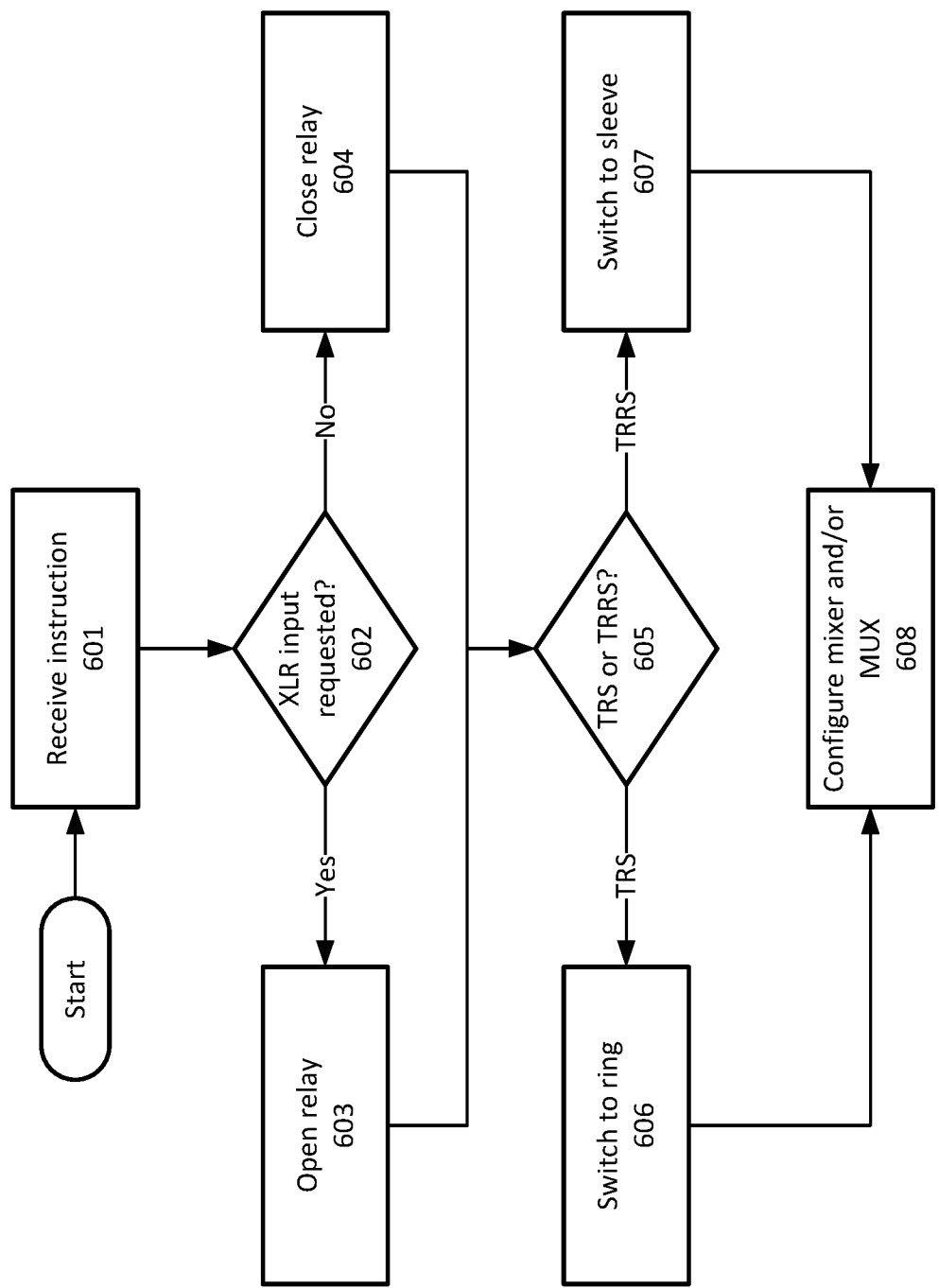
FIG. 6A is an example flowchart of a method that may be performed in accordance with aspects described herein.

FIG. 6A is an example flowchart of a method that may be performed while a microphone that comprises circuitry 100 or circuitry 400 is in operation. In the following description, it will be assumed by way of example that each step is performed by controller 110 as part of circuitry 100 or circuitry 400. However, any or all of the steps may be performed by any other portion of circuitry 100 or circuitry 400, such as by codec/DSP 180 or codec/DSP 480. While the method illustrated in FIG. 6A shows particular steps in a particular order, the method may be further subdivided into additional sub-steps, steps may be combined, and the steps may be performed in another order without necessarily deviating from the concepts described herein.

At step 601, controller 110 may receive an instruction. The instruction may be generated by, for example, the user interface 112 in response to a user input. Or, the instruction may be generated internally by controller 110. Or, the instruction may be received via USB connector 111 and generated by another device connected to the microphone via USB connector 111 (such as device 802 in FIG. 8). The instruction may identify or otherwise be associated with a particular configuration of the microphone. For example, the user may operate user interface 112 of the microphone, or operate a user interface of the USB-connected device, to select a particular microphone configuration. The microphone configuration may indicate or otherwise be associated with a particular state of relay 104, a particular mixing configuration of mixer 107, and/or a particular multiplexing configuration of multiplexer 108 (for circuitry 100), or with a particular state of relay 104 and/or a particular mixing and/or multiplexing configuration of mixer 407 (for circuitry 400). The configuration indicated by or otherwise associated with the instruction may, for example, be one of the configurations described herein with respect to any of FIGS. 3A-3F. However, any other configurations of any of the elements of circuitry 100 or circuitry 400 may be indicated or otherwise associated with the instruction.

The instruction may explicitly identify the configuration(s) of the various elements, such as by explicitly identifying a relay state, a mixer configuration (e.g., mix codec input 1 with codec input 2 at a 50/50 ratio), and/or a multiplexer configuration (e.g., connect one or more particular inputs of the multiplexer to one or more particular outputs of the multiplexer). Or, the instruction may identify a configuration using shorthand, such as with an index identifier. For example, a first configuration may be assigned a particular Configuration value (e.g., a first configuration may be assigned ConfigurationID=1, a second configuration may be assigned ConfigurationID=2, etc.). Each ConfigurationID value may be associated (e.g., in a look-up table by controller 110, stored in storage 202) with the details of the associated configuration. In such a case, controller 110 would use the ConfigurationID value and the look-up table to determine the configuration of each elements of circuitry 100 or circuitry 400, and then use that configuration to control the configuration of each of the elements. An example of the type of information stored in the look-up table may be as shown in Table 1 below. The "Relay 104" column may or may not be part of the table.

TABLE 1

Example Look-Up Table

| ConfigurationID | Relay 104 | mixer 407 (or mixer 107 and multiplexer 108) |
|---|---|---|
| 1 | open | left channel: mix of codec input 1 and codec input 2 at 40/60 ratio. right channel: only codec channel 3, no mix. |
| 2 | open | left channel: codec input 1, no mix. right channel: codec input 2, no mix. |
| 3 | open | ... |
| ... | closed | ... |

In some cases, the instruction may or may not indicate whether an XLR input is requested and/or whether a TRS connector or a TRRS connector is used. In such cases where the instruction does not identify these, controller 110 may be able to separately ascertain these by sending whether voltages are present on the respective connector types to determine which connectors are plugged in.

At step 602, controller 110 may determine, based on the instruction and/or based on a separate sensing (e.g., of connector voltages) whether an XLR input is requested, in other words, whether XLR connection 103 is to be used as an input or an output. If XLR connection 103 is to be used as an input, then at step 603, controller 110 controls relay driver 102 to open relay 104 (if it is not already open) to produce an open circuit state between nodes 151 and 152, such as illustrated in FIG. 3A. If XLR connection 103 is not to be used as an input (e.g., is to be used as an output), then at step 604, controller 110 controls relay driver 102 to close relay 104 (if it is not already closed) to produce a closed circuit state between nodes 151 and 152, such as illustrated in FIG. 3B. Steps 601-604 are applicable to both examples of circuitry 100 and circuitry 400, and thus may be performed while using either circuitry.

At step 605, controller 110 may determine, based on the instruction and/or based on a separate sensing (e.g., of connector voltages), a particular type of connector(s) that is/are connected to the microphone. For example, controller 110 may determine whether a TRS connector or a TRRS connector is connected to headphone connection 113. If controller 110 determines that a TRS connector is connected, then at step 606, controller 110 may cause switch 403 to connect the ring node of combo jack 402 to codec input 4. If controller 110 determines that a TRS connector is connected, then at step 607, controller 110 may cause switch 403 to connect the sleeve node of headphone connection 113 to codec input 4. While steps 605-607 are shown as being performed after steps 602-604, steps 605-607 may be performed before steps 602-604 and/or in parallel with steps 602-604. Also, steps 605-607 may be skipped, such as where circuitry 100 is used and/or where no switch 403 or combo jack 402 is used.

At step 608, controller 100 may send signals to mixer 107 and/or multiplexer 108 (for circuitry 100) or to mixer 407 (for circuitry 400) that cause these elements to attain the desired respective configurations indicated by or otherwise associated with the instruction of step 601.

Figure 6B:
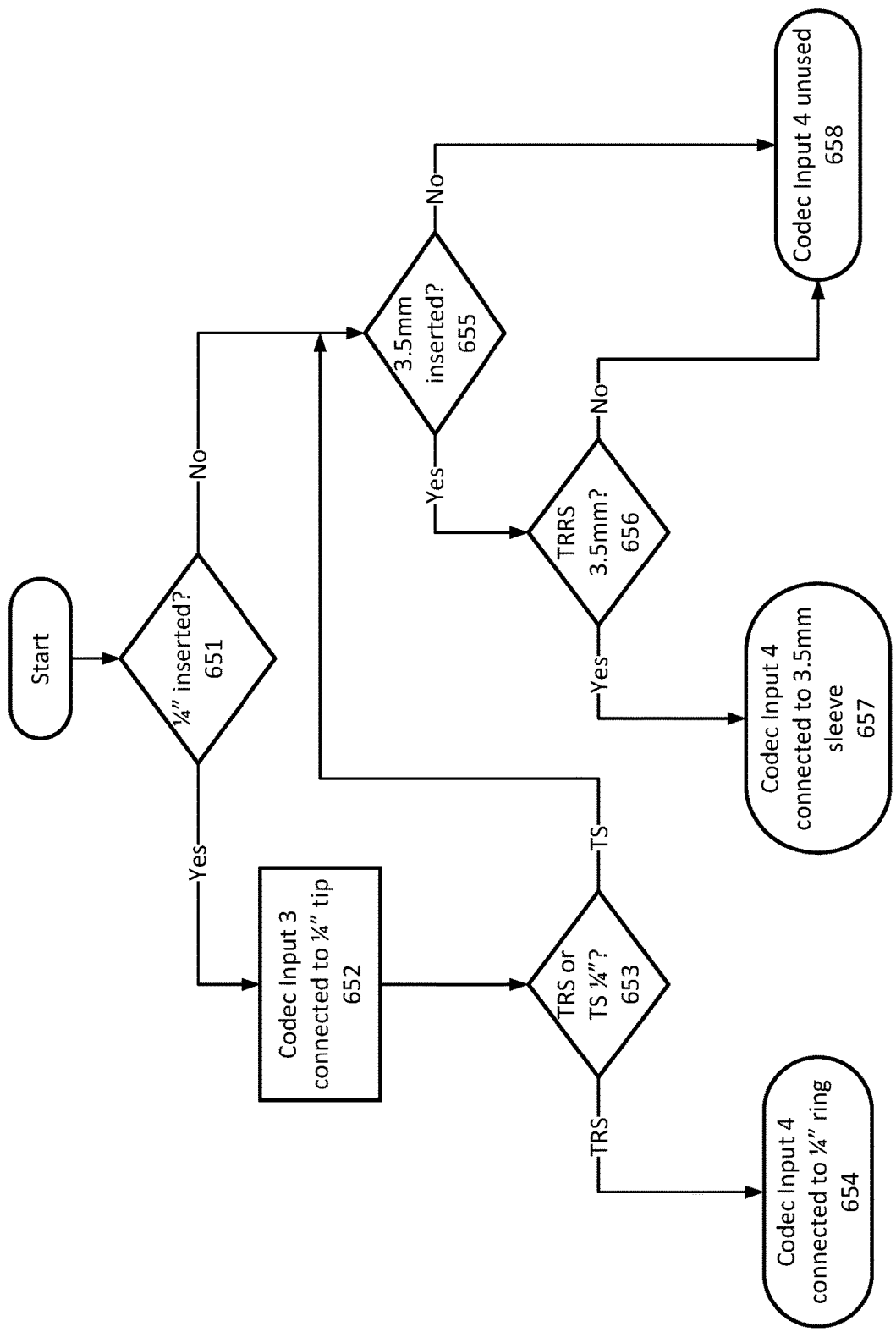
FIG. 6B is an example flowchart of another method that may be performed in accordance with aspects described herein.

FIG. 6B is an example flowchart of another method that may be performed while a microphone that comprises circuitry, such as circuitry 400, is in operation. In the following description, it will be assumed by way of example that each step is performed by controller 110 as part of circuitry 400. However, any or all of the steps may be performed by any other portion of circuitry 400, such as by codec/DSP 480. While the method illustrated in FIG. 6B shows particular steps in a particular order, the method may be further subdivided into additional sub-steps, steps may be combined, and the steps may be performed in another order without necessarily deviating from the concepts described herein. In certain steps, it is determined whether a particular connector has been inserted. This may be determined based on electrical currents and/or voltages sensed using conventional current sensor circuitry and/or voltage sensor circuitry (which may generate the above-mentioned connection sense signal) that may be part of controller 110 or in communication with controller 110.

At step 651, it may be determined whether a quarter-inch connector has been inserted. if so, then it may be determined at step 652 that codec input 3 404 is connected to a quarter-inch tip, and it may be further determined at step 653 whether the inserted quarter-inch connector is a TRS (stereo) or a TS (mono) connector. If it is determined that the inserted connector is a TRS connector, then it may be determined at step 654 that codec input 4 405 is connected to a quarter-inch ring of the inserted connector. On the other hand, if it is determined that the inserted connector is a TS connector, then it may be determined at step 655 whether a 3.5 mm connector is inserted. If it is determined that a 3.5 mm connector is inserted, then at step 656 it may be determined whether the inserted connector is a 3.5 mm TRRS connector. If it is determined that the inserted connector is a 3.5 mm TRRS connector, then it may be determined at step 657 that the codec input 4 405 is connected to a 3.5 mm sleeve. If it is determined that a 3.5 mm connector is not inserted, then it may be determined at step 658 that codec input 4 405 is unused. Controller 110 may store data (such as in storage 102) indicating the connection status of any of the codec inputs 1-4. Based on this stored data, controller 110 may cause any element of CODEC/DSP 480, such as mixer 407, to be configured in a particular manner. For example, if it is determined at step 658 that codec input 4 is unused, then controller 110 may configure mixer 407 to ignore (and not mix in) any signals received from codec input 4 via line 454. Or, for example, if it is determined at steps 652 and 654 that codec input 3 is connected to a quarter-inch TRS connector's tip and that codec input 4 is connected to the quarter-inch TRS connector's ring, then controller 110 may configured mixer 407 to treat the signal from codec input 3 as a left audio channel and the signal from codec input 4 as a right audio channel (or vice-versa). For example, mixer 407 may be configured not to mix (and to keep on separate audio channels) the audio from codec input 3 with the audio from codec input 4.

Figure 7:
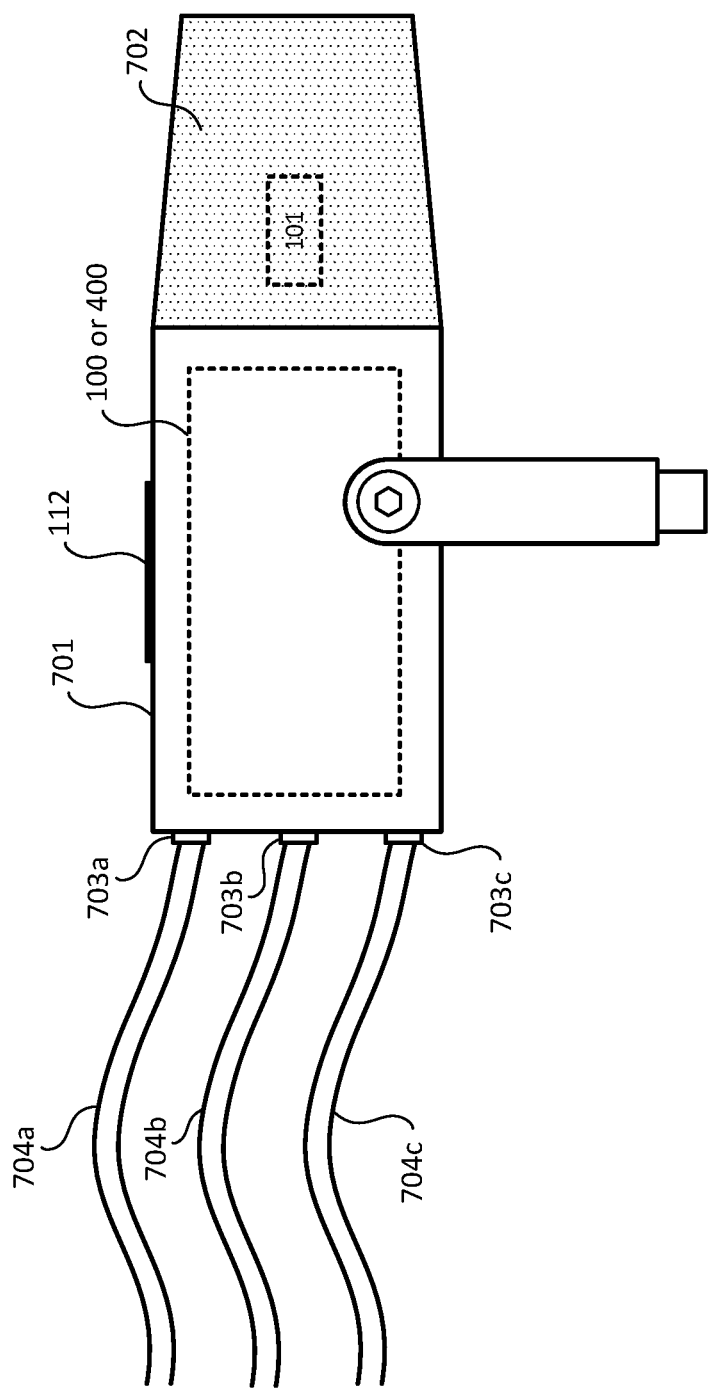
FIG. 7 is a side view of an example microphone containing microphone circuitry such as the circuitry shown in FIG. 1 or 4 in accordance with aspects described herein.

FIG. 7 is a side view of an example microphone 700 containing microphone circuitry such as circuitry 100 or circuitry 400 shown in FIG. 1 or 4. Microphone 700 may comprise a body 701, which may house one or more other components of microphone 700, such as circuitry 100 or circuitry 400. Microphone 700 may further include a windscreen 702 covering microphone cartridge 101. User interface 112 may be disposed on and/or in body 701 so as to be at least partially accessible by a user of microphone 700.

Body 701 may have one or more connectors, such as connectors 703a, 703b, and/or 703c, which may selectively connect, respectively, to one or more cables such as cables 704a, 704b, and/or 704c that themselves have compatible connectors. While three connectors are shown, there may be any number of connectors included. The connectors (generically referred to herein as one or more connectors 703) may be, for example, one or more universal serial bus (USB) connectors, one or more XLR connectors, one or more power connectors, one or more TRS connectors, one or more TRRS connectors, one or more combo jacks, and/or any other type of data and/or power connectors suitable for transporting signals such as power, digital data (including digital audio signals), and/or analog audio signals to and from the circuitry of microphone 700. For example, any of connectors 703 may be XLR connector 103, USB connector 111, combo jack 402, quarter-inch TRS connector 401, and/or headphones connector 113 (e.g., a 3.5 mm TRRS connector).

Figure 8:
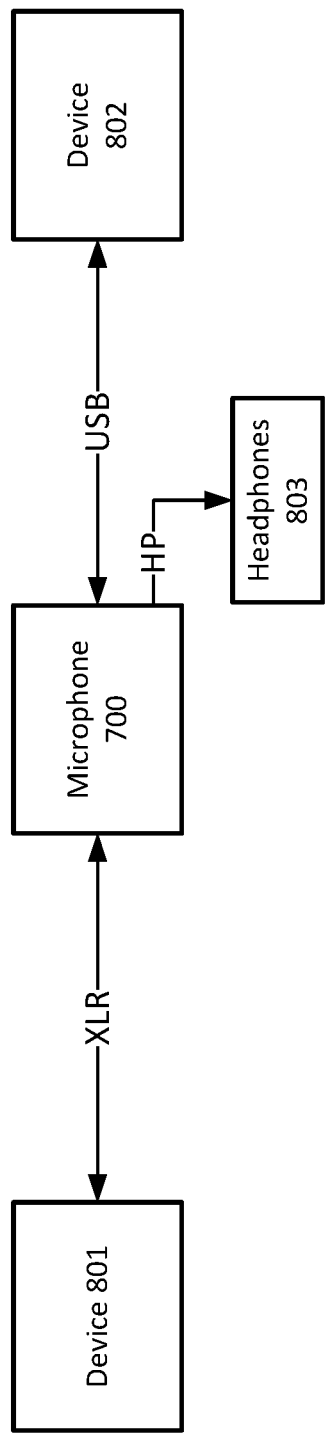
FIG. 8 is a block diagram of an example system that includes a microphone in accordance with aspects described herein.

FIG. 8 is a block diagram of an example system that includes microphone 700. In the shown example, microphone 700 may be connected to one or more other devices, such as device 801 and/or device 802. Device 801 may be connected with microphone 700 via, for example, XLR connector 103. Device 802 may be connected with microphone 700 via, for example, USB connector 111. Microphone 700 may also be connected to headphones 803, such as via TRRS headphones connector 113 or TRS connector 401.

Devices 801 and 802 each may be any type of device capable of sending and/or receiving audio signals and/or data signals, such as another microphone, an audio source, a speaker, a mixer, an audio recording device, or a computer such as a smart phone or laptop computer, etc. In one example, device 801 may be another microphone that provides audio signals into XLR connector 103, and device 802 may be a smart phone that provides a user interface allowing a user to select a configuration of microphone 700. The selected configuration may cause XLR connector 103 may be used as an input connector and cause audio signals provided by device (microphone) 801 to be mixed in a particular way with audio picked up by microphone cartridge 101 of microphone 700. The resulting mixed audio signals may be output to headphone 803 and/or output to device (smart phone) 802 via USB connector 111. In other examples, device 801 may be an audio recording device or a speaker (or even another microphone similar or identical to microphone 700), in which case the configuration selected via device (smart phone) 802 may cause XLR connector 103 to be used as an output connector and cause audio signals generated by microphone cartridge 101 to be output to device 801 (and also to be received by codec input 2 of microphone 700).

Thus, the XLR connector (which may be passive) of microphone 700 may be used as either an input connector or as an output connector to be daisy chained with the XLR connector of the other device such as another microphone. Accordingly, the user of the microphone may be able to conveniently use one or more of the connectors of microphone 700 to expand the microphone 700 to become part of a larger setup that uses a plurality of microphones. For example, audio signals from two or more separate, non-colocated microphones may be mixed and then output via a single USB connection. One of the microphone's signals may be generated by microphone cartridge 101 integral to microphone 700, and another of the microphone's signals may be generated by an external microphone such as device 801.

Moreover, because a switchable XLR connector 103 may be used, such an XLR connector may function as an analog output in a standalone mode of microphone 700, yet when placed into a mix mode, XLR connector 103 may function as a discrete analog input into the digital signal chain of circuitry 100 or circuitry 400, thereby producing two discrete output digital channels (e.g., left and right stereo channels) via USB connector 111 to another device such as device 802. This may be useful for, e.g., a mobile two-channel podcasting setup, as well as any other two (or other multi-) channel recording setups for personal use (e.g., in a vocalist/guitar arrangement or a vocal duet arrangement).

While a USB connection is discussed between the microphone 100 and the device 202, other types of wired or wireless connections may be used. For example, the connection between microphone 700 and device 802 may instead be a wireless connection, such as a Wi-Fi connection, a BLUETOOTH connection, a near-field connection (NFC), and/or an infrared connection. Where the connection is wireless, microphone 700 and device 802 may include a wireless communications interface. Also, while particular types of connectors are discussed (XLR connectors, USB connectors, TRS connectors, and TRRS connectors), these are by way of example only; this description is not limited to these particular types of connectors, and any other types of connectors may be used in their place, as desired.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A microphone comprising:
a housing comprising a first connection port, a second connection port, a third connection port, and a fourth connection port;
a microphone element at least partially enclosed by the housing; and
circuitry at least partially enclosed by the housing, configured to switch between a first mode and a second mode, and configured to:
in the first mode:
generate a first analog signal in response to sound received by the microphone element;
provide a second analog signal, based on the first analog signal, to the first connection port; and
produce at the second connection port a first digital signal based on the first analog signal and based on a third analog signal received via the third connection port; and
in the second mode:
generate a fourth analog signal in response to sound received by the microphone element;
provide a fifth analog signal, based on the fourth analog signal, to the first connection port; and
produce at the second connection port a second digital signal based on the fourth analog signal and based on a sixth analog signal received via the fourth connection port.

2. The microphone of claim 1, wherein the sixth analog signal comprises a signal produced by a device external to the housing and electrically connected with the fourth connection port.

3. The microphone of claim 1, wherein the circuitry comprises:
at least one coder-decoder (codec) configured to encode, when the circuitry is in the second mode, the fourth analog signal as a third digital signal and to encode the sixth analog signal as a fourth digital signal; and
a mixer configured to mix, when the circuitry is in the second mode, the third digital signal and the fourth digital signal to produce the second digital signal.

4. The microphone of claim 1, wherein the circuitry is further configured to receive a signal via the second connection port, and to select between the first mode and the second mode based on the signal received via the second connection port.

5. The microphone of claim 1, wherein:
the second analog signal is further based on the third analog signal, and
the fifth analog signal is further based on the sixth analog signal.

6. The microphone of claim 1,
wherein the circuitry is configured to:
convert the first analog signal to a third digital signal,
convert the third analog signal to a fourth digital signal,
convert the fourth analog signal to a fifth digital signal, and
convert the sixth analog signal to a sixth digital signal, and
wherein:
each of the second analog signal and the first digital signal is based on the third digital signal and the fourth digital signal, and
each of the fifth analog signal and the second digital signal is based on the fifth digital signal and the sixth analog signal.

7. The microphone of claim 1,
wherein the circuitry is configured to:
convert the first analog signal to a third digital signal,
convert the third analog signal to a fourth digital signal,
convert the fourth analog signal to a fifth digital signal, and
convert the sixth analog signal to a sixth digital signal, and
wherein the microphone further comprises at least one mixer configured to mix the third digital signal with the fourth digital signal and to mix the fifth digital signal with the sixth digital signal.

8. The microphone of claim 1,
wherein the circuitry is configured to:
convert the first analog signal to a third digital signal; and
convert the third analog signal to a fourth digital signal, and
wherein the microphone further comprises at least one mixer configured to mix the third digital signal with the fourth digital signal using a mixing ratio that is based on a signal received via the second connection port.

9. The microphone of claim 1, wherein:
the first connection port comprises a TRRS connector,
the second connection port comprises a USB connector,
the third connection port comprises an XLR connector, and
the fourth connection port comprises a TRS connector.

10. The microphone of claim 1, wherein the microphone comprises a combo jack, and wherein the combo jack comprises the third connection port and the fourth connection port.

11. A method comprising:
in a first mode of a microphone that comprises a first connection port, a second connection port, a third connection port, and a fourth connection port:
generating a first analog signal based on received sound;
providing a second analog signal, based on the first analog signal, to the first connection port;
generating a first digital signal based on the first analog signal and based on a third analog signal received via the third connection port; and
providing the first digital signal to the second connection port; and
in a second mode of the microphone:
generating a third fourth analog signal based on received sound;
providing a fifth analog signal, based on the fourth analog signal, to the first connection port;
generating a second digital signal based on the fourth analog signal and based on a sixth analog signal received via the fourth connection port; and
providing the second digital signal to the second connection port.

12. The method of claim 11, wherein the sixth analog signal comprises a signal produced by a device external to the microphone and electrically connected with the fourth connection port.

13. The method of claim 11, wherein the generating the second digital signal comprises:
generating, based on the fourth analog signal, a third digital signal;
generating, based on the sixth analog signal, a fourth digital signal; and
mixing the third digital signal and the fourth digital signal to produce the second digital signal.

14. The method of claim 11, further comprising:
receiving a signal via the second connection port; and
causing the microphone to select between the first mode and the second mode based on the signal received via the second connection port.

15. The method of claim 11, wherein:
the providing the second analog signal comprises providing the second analog signal based on the first analog signal and further based on the third analog signal, and
the providing the fifth analog signal comprises providing the fifth analog signal based on the fourth analog signal and further based on the sixth analog signal.

16. The method of claim 11, further comprising:
converting the first analog signal to a third digital signal;
converting the third analog signal to a fourth digital signal;
converting the fourth analog signal to a fifth digital signal; and
converting the sixth analog signal to a sixth digital signal, wherein:
the providing the second analog signal is based on the third digital signal and the fourth digital signal,
the generating the first digital signal is based on the third digital signal and the fourth digital signal,
the providing the fifth analog signal is based on the fifth digital signal and the sixth analog signal, and
the generating the second digital signal is based on the fifth digital signal and the sixth analog signal.

17. The method of claim 11, further comprising:
converting the first analog signal to a third digital signal;
converting the third analog signal to a fourth digital signal;
converting the fourth analog signal to a fifth digital signal;
converting the sixth analog signal to a sixth digital signal;
mixing the third digital signal with the fourth digital signal; and
mixing the fifth digital signal with the sixth digital signal.

18. The method of claim 11, further comprising:
converting the first analog signal to a third digital signal;
converting the third analog signal to a fourth digital signal;
receiving, via the second connection port, a signal; and
mixing the third digital signal with the fourth digital signal, using a mixing ratio that is based on the signal received via the second connection port.

19. The method of claim 11, wherein:
the first connection port comprises a TRRS connector,
the second connection port comprises a USB connector,
the third connection port comprises an XLR connector, and
the fourth connection port comprises a TRS connector.

20. The method of claim 11, wherein the microphone comprises a combo jack, and wherein the combo jack comprises the third connection port and the fourth connection port.

* * * * *